United States Patent
Stothers et al.

(10) Patent No.: US 7,398,143 B2
(45) Date of Patent: Jul. 8, 2008

(54) ACTIVE VIBRATION ABSORBER AND METHOD

(75) Inventors: Ian Stothers, Saham Tomey (GB); Ivan Scott, Cambridge (GB); Richard Hinchliffe, Stockton Chashire (GB)

(73) Assignee: Ultra Electronics Limited, Middlesex (GB)

( * ) Notice: Subject to any disclaimer, the term of this patent is extended or adjusted under 35 U.S.C. 154(b) by 0 days.

(21) Appl. No.: 11/388,318

(22) Filed: Mar. 24, 2006

(65) Prior Publication Data

US 2007/0028885 A1 Feb. 8, 2007

Related U.S. Application Data

(63) Continuation of application No. PCT/GB2004/004062, filed on Sep. 24, 2004.

(30) Foreign Application Priority Data

Sep. 24, 2003 (GB) ................ 0322404.5

(51) Int. Cl.
*B60G 17/018* (2006.01)
(52) U.S. Cl. .................. 701/37; 267/136
(58) Field of Classification Search ........... 701/37, 701/38, 36; 267/136, 140.11, 140.12–140.15
See application file for complete search history.

(56) References Cited

U.S. PATENT DOCUMENTS

| 4,821,849 | A | 4/1989 | Miller |
|---|---|---|---|
| 5,255,764 | A | 10/1993 | Kurabayashi |
| 5,456,341 | A | 10/1995 | Garnjost |
| 5,613,009 | A | 3/1997 | Miyazaki et al. |
| 5,713,438 | A | 2/1998 | Rossetti et al. |
| 5,730,429 | A | 3/1998 | Ivers et al. |
| 5,839,082 | A * | 11/1998 | Iwasaki .................. 701/38 |
| 6,059,274 | A | 5/2000 | Owen et al. |
| 6,213,442 | B1 | 4/2001 | Ivers et al. |
| 7,005,816 | B2 * | 2/2006 | Hio et al. ................ 318/375 |

FOREIGN PATENT DOCUMENTS

| EP | 0884595 A1 | 12/1998 |
|---|---|---|
| WO | WO-96/12121 | 4/1996 |

* cited by examiner

*Primary Examiner*—Richard M. Camby
(74) *Attorney, Agent, or Firm*—Robert E. Stachler, II

(57) ABSTRACT

An active vibration absorber is provided for absorbing vibrations in a member. An inertial mass is mounted on the member with a stiffness between the member and the mass. A force actuator arrangement applies a force between the inertial mass and the member. A damping arrangement provides for damping of a resonance of the active vibration absorber. A first sensor arrangement provides at least one first signal indicative of at least one movement and/or stress related parameter for the member and a second sensor arrangement provides for at least one second signal indicative of a reaction of the inertial mass. A control arrangement is provided for controlling the force actuator arrangement using the at least one first signal and the at least one second signal.

30 Claims, 6 Drawing Sheets

PRIOR ART

ACTIVE VIBRATION ABSORBER AND METHOD

CROSS-REFERENCE TO RELATED APPLICATION

This application is a continuation of a co-pending U.S. application entitled "An Adaptive Control Unit With Feedback Compensation", having Ser. No. 11/388,318, with a filing date of Mar. 24, 2006; international application PCT/GB 2004/004062, with an international filing date of Sep. 23, 2004, entitled, "ACTIVE VIBRATION ABSORBER AND METHOD"; and international application GB/0322404.5, with a filing date of Sep. 24, 2003, all of which is incorporated by reference herein in its entirety.

TECHNICAL FIELD

The present invention generally relates to an active vibration absorber for absorbing vibrations in a member.

BACKGROUND OF THE INVENTION

It is well known in the prior art that it is desirable to provide a vibration absorber that can absorb vibrations in a vibrating member.

One prior art technique for absorbing vibrations comprises a tuned vibration absorber. Such a passive absorber is illustrated in FIG. 1. As illustrated in this diagram, a vibrating member in which the vibrations are to be reduced by absorption comprises a base 1. An inertial mass 2 is stiffly mounted to the base 1 by a stiffness element which is illustrated as a spring member 3. As is well known in the art, the mass and the stiffness of the spring can be selected or tuned to a particular frequency to provide absorption at the frequency. At the particular chosen frequency resonance occurs by movement of the inertial mass 2 thus causing an absorption of the vibrations in the base 1. FIG. 2 is a graph illustrating the amplitude of vibrations in the mass 2 when the mass is mounted to the base 1 in an undamped manner.

It can be seen in FIG. 2 that although the undamped vibration absorber provides for good absorption at the resonance frequency, the frequency range is limited. Thus, it is known to provide a damper 4 to damp the vibrations between the mass 2 and the base 1. The damping provides for a reduction in the peak height of the resonance and a broadening of the peak. This is illustrated in FIG. 2.

The well-known passive tuned vibration absorber is limited in that it has a narrow frequency response. If the absorption of more than one frequency is required, typically more than one tuned vibration absorber is required. Also, the resonance frequency of the tuned vibration absorber is fixed by the effective mass of the inertial mass 2 and the spring stiffness of the spring member 3.

A known active vibration absorber is illustrated in FIG. 3. An inertial mass 11 is mounted to a base 10 via a spring arrangement 12. An actuator 13 is provided to provide a force between the mass 11 and the base 10. A sensor 14 senses vibrations in the base 10 and provides for an error signal which is input to a controller 15 having a gain G to generate a control signal for the actuator 13. Controller 15 comprises an adaptive controller which controls the actuator 13 in order to reduce the vibrations sensed by the sensor 14. As the controller 15 achieves control, i.e. vibrations are absorbed in the base 10, the error signal 14 provided for feedback control to the controller 15 reduce in amplitude and will tend towards zero. It is thus necessary for the controller 15 to have a very high feedback gain in order to provide for control. This provides a problem with stability. Further, although some passive damping can be provided between the mass 11 and the base 10, this is not actively controlled.

SUMMARY OF THE INVENTION

An active vibration absorber is provided for absorbing vibrations in a member. An inertial mass is mounted on the member with a stiffness between the member and the mass. A force actuator arrangement applies a force between the inertial mass and the member. A damping arrangement provides for damping of a resonance of the active vibration absorber. A first sensor arrangement provides at least one first signal indicative of at least one movement and/or stress related parameter for the member and a second sensor arrangement provides for at least one second signal indicative of a reaction of the inertial mass. A control arrangement is provided for controlling the force actuator arrangement using the at least one first signal and the at least one second signal.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 1:
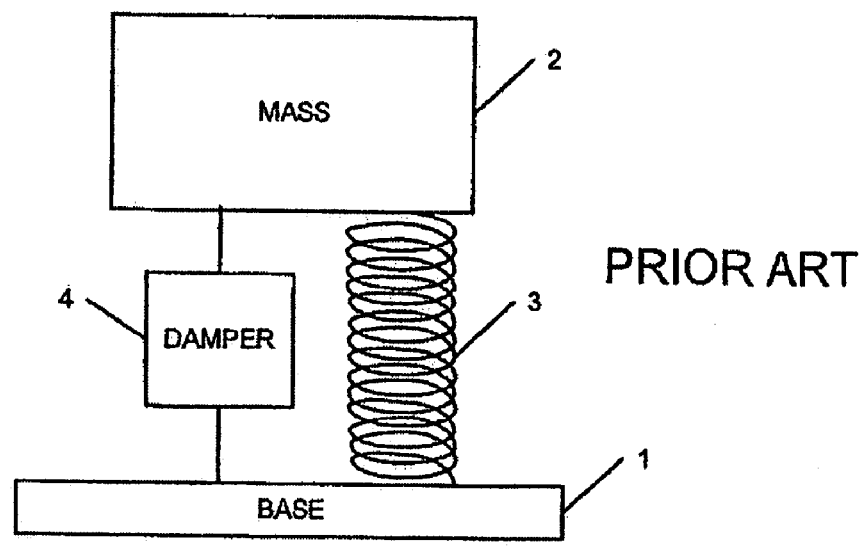
FIG. 1 is a schematic diagram of a tuned vibration absorber in accordance with the prior art.
Figure 2:
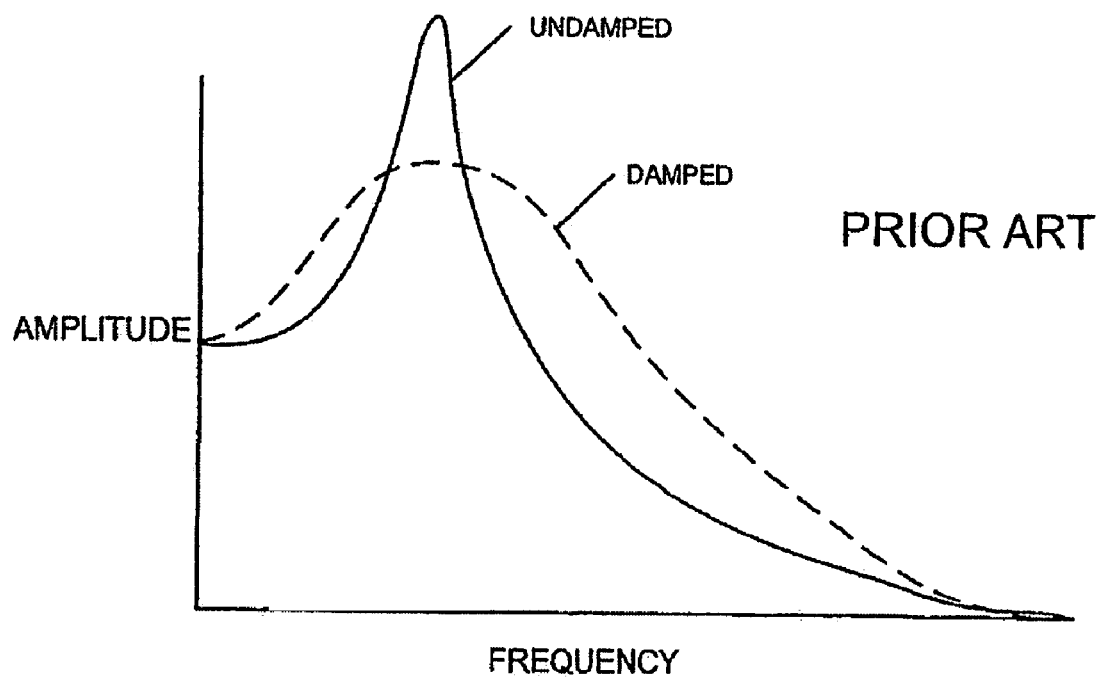
FIG. 2 is a graph illustrating the response of the tuned vibration absorber of FIG. 1.
Figure 3:
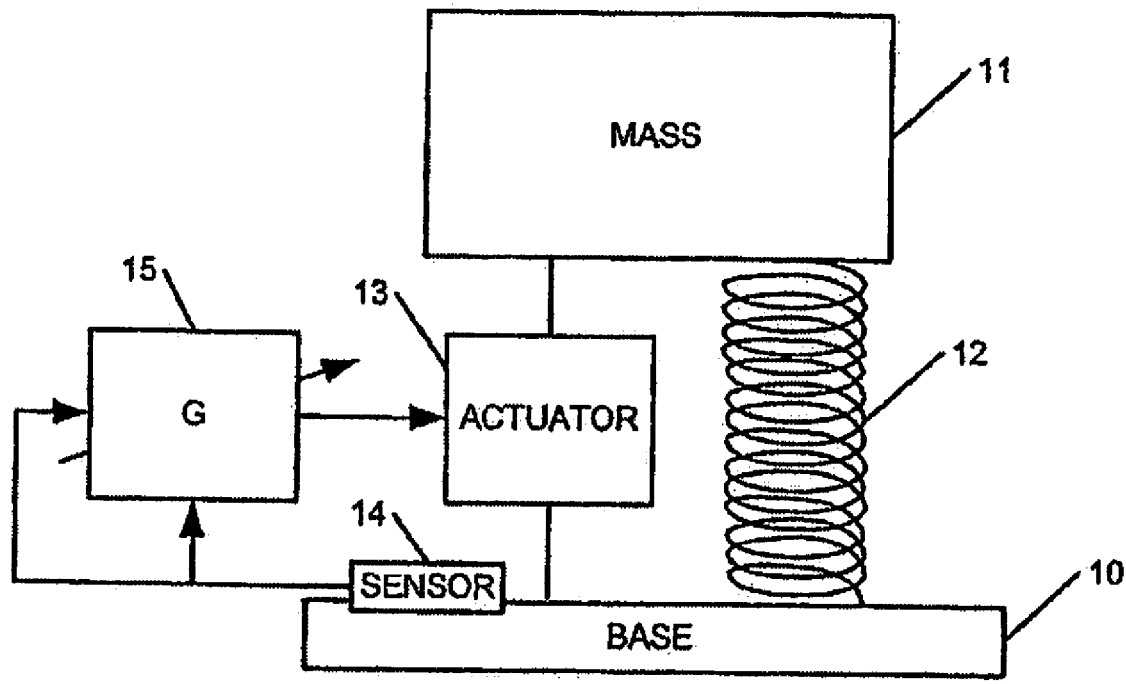
FIG. 3 is a schematic diagram of an active vibration absorber in accordance with the prior art.

It is an object of the present invention to provide an improved vibration absorber in the form of an active vibration absorber.

A first aspect of the present invention provides an active vibration absorber for absorbing vibrations in a member in which an inertial mass is mounted on the member with a stiffness between the member and the mass. A force actuator arrangement applies a force between the inertial mass and the member. A damping arrangement is provided for damping a resonance of the active vibration absorber. A first sensor arrangement provides at least one first signal indicative of at least one of movement and/or stress related parameters for the member. A second sensor arrangement provides at least one second signal indicative of a reaction of the inertial mass. A control arrangement controls the force actuator arrangement using the at least one first signal and the at least one second signal.

Thus in this aspect of the present invention active control of the application of a force between the mass and the member is actively controlled in dependence upon a feedback signal indicative of vibrations in the member and a second signal which does not tend to zero when control of the vibrations is achieved, i.e. the second signal is indicative of a reaction of the inertial mass.

In one embodiment of the present invention, the inertial mass can be mounted to the member using a stiffness arrangement such as a spring arrangement. In an alternative embodiment of the present invention, the force actuator arrangement can provide the stiffness and the mass is thus mounted with a stiffness to the member by the force actuator arrangement.

In one embodiment of the present invention the control arrangement comprises a first filter arrangement for filtering each first signal, a second filter arrangement for filtering each second signal, and a combining arrangement such as a summer (a summation unit) for combining outputs of the first and second filter arrangements for output to control the force actuator arrangement. In this embodiment of the present invention the first and/or the second filter arrangements can be adaptive filters responsive to the at least one first signal.

In one embodiment of the present invention the damping arrangement includes a third sensor arrangement for providing at least one third signal indicative of a velocity of the inertial mass, and a damping control arrangement adapted to use the third signal to control the force actuator arrangement to provide damping of a resonance of the active vibration absorber. Thus in this embodiment of the present invention active damping is provided using a third sensor arrangement.

In an alternative embodiment of the present invention, the second sensor arrangement is adapted to provide each second signal as indicative of a velocity of the inertial mass. In this arrangement the damping arrangement comprises a damping control arrangement adapted to use the second signals to control the force actuator arrangement to provide damping of a resonance of the active vibration absorber. Thus in this embodiment of the present invention, active damping is provided using an output of the second sensor arrangement which is provided in common to the damping control arrangement and the control arrangement.

In an alternative embodiment of the present invention the damping arrangement comprises a mechanical or fluid damping arrangement for connection between the inertial mass and the member. Thus in this embodiment of the present invention a separate damping configuration is provided in parallel with the stiff mounting of the mass to the member and the application of the force between the mass and the member.

A second aspect of the present invention provides an active vibration absorber for absorbing vibrations in a member in which an inertial mass is mounted on the member with a stiffness between the mass and the member. A force actuator arrangement is provided for applying a force between the inertial mass and the member. A first sensor arrangement provides at least one first signal indicative of a velocity of the inertial mass. The damping control arrangement controls the damping of a resonance of the active vibration absorber by controlling the force actuator arrangement using the at least one first signal. A second sensor arrangement provides at least one second signal indicative of at least one of movement and/or stress related parameters for the member. A feedback control arrangement is provided for controlling the force actuator arrangement using the at least one second signal to reduce the movement and/or stress in the member.

This aspect of the present invention provides for active vibration absorption in a member by providing for active damping in conjunction with an active feedback control of the application of the force between the inertial mass and the member.

In one embodiment of this aspect of the present invention the inertial mass is mounted on the member using a stiffness arrangement such as a spring arrangement.

In an alternative embodiment of the present invention the force actuator arrangement is used to mount the inertial mass and provide for the stiff mounting of the inertial mass to the member.

In one embodiment of the present invention the feedback control arrangement comprises a filter arrangement for filtering each second signal to generate a control signal for the force control arrangement. In a specific embodiment the filter arrangement comprises an adaptive filter arrangement which is adapted in response to the at least one second signal.

The present invention also provides a method of absorbing vibrations in a member comprising mounting an inertial mass on the member with a stiffness therebetween, applying a force between the inertial mass and the member using a force actuator arrangement, damping a resonance of the inertial mass, providing at least one first signal indicative of at least one movement and/or stress related parameter for said member, providing at least one second signal indicative of a reaction of the inertial mass, and controlling the application of the force using the at least one first signal and the at least one second signal.

The present invention also provides a method of absorbing vibrations in a member comprising mounting an inertial mass on the member with a stiffness therebetween, applying a force between the inertial mass and the member using a force actuator arrangement, providing at least one first signal indicative of a velocity of the inertial mass, controlling a damping of a resonance of the inertial mass by controlling the force actuator arrangement using the at least one first signal, providing at least one second signal indicative of at least one movement and/or stress related parameter for the member, and controlling the force actuator arrangement using the at least one second signal to reduce the movement and/or stress in the member.

Figure 4:
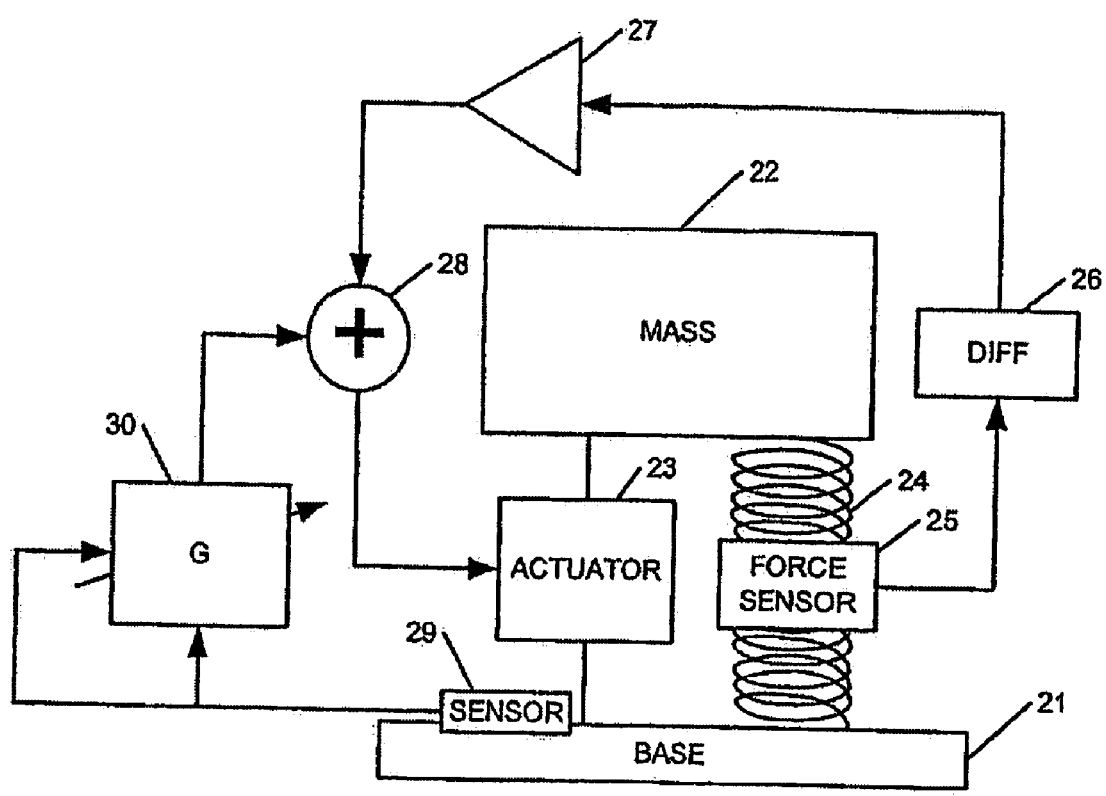
FIG. 4 is a schematic diagram of an active vibration absorber in accordance with a first embodiment of the present invention.

FIG. 4 illustrates a first embodiment of the present invention in which an active vibration absorber is provided with feedback control of the application of force as well as the active control of damping.

A base 21 comprises a member experiencing vibration which is to be controlled. The base 21 can thus experience displacement, velocity, acceleration, bending, and strain. All of these parameters are indicative of vibrations in the base 21.

A mass 22 has an inertial mass and is mounted on the base 21 via a stiffness arrangement which in this embodiment comprises a spring arrangement 24. Although the spring arrangement 24 is illustrated as a helical spring, any stiff mounting arrangement for the mass 22 on the base 21 can be used.

A force actuator 23 is provided coupled between the mass 22 and the base 21 in order to apply a force between the mass 22 and the base 21. A force sensor 25 is provided to measure the force in the spring arrangement 24. The force detected is proportional to the displacement of the spring arrangement 24. The output of the force sensor 25 is thus differentiated by the differentiator 26 in order to provide a signal proportional to the relative velocity of the mass 22 and the base 21. The output of the differentiator 26 is input to an amplifier 27 which applies a negative gain to the signal in order to generate a control signal for the actuator 23. The output control signal from the amplifier 27 is input through a combining arrangement which in this embodiment comprises a summer 28. The output of the summer 28 is then input into the actuator 23 for control of the force actuator 23. In this way the damping of the active vibration absorber is achieved through active control using the force actuator 23 which receives a signal indicative of the relative velocity of the mass 22 and the base 21.

A sensor 29 is provided on the base 21 for detecting vibration related parameters such as displacement, velocity, acceleration, bending, or strain. The output of the sensor 29 is thus an error signal indicating the degree of vibration experienced in the base 21. A controller 30 is provided to operate adaptively using the error signal from the sensor 29 to generate a control signal for the actuator 23. The output control signal from the controller 30 is input into the summer 28 to be combined with the output of the amplifier 27 for the control of the actuator 23.

Thus this embodiment of the present invention provides for the active control of the damping as well as the active control of the application of the force for feedback control. The controller 30 can be implemented in analogue or digital technology or a combination of both. The controller implements well known feedback control methodology. The controller 30 can for example be implemented as a digital feedback controller as for example described in "Adaptive Signal Processing" by B. Widrow and S. Stearns (Prentice-Hall Inc., 1985).

This embodiment of the present invention in which the adaptive damping is used makes it simpler to implement the controller 30 with the high gain necessary to provide for feedback control.

Figure 5:
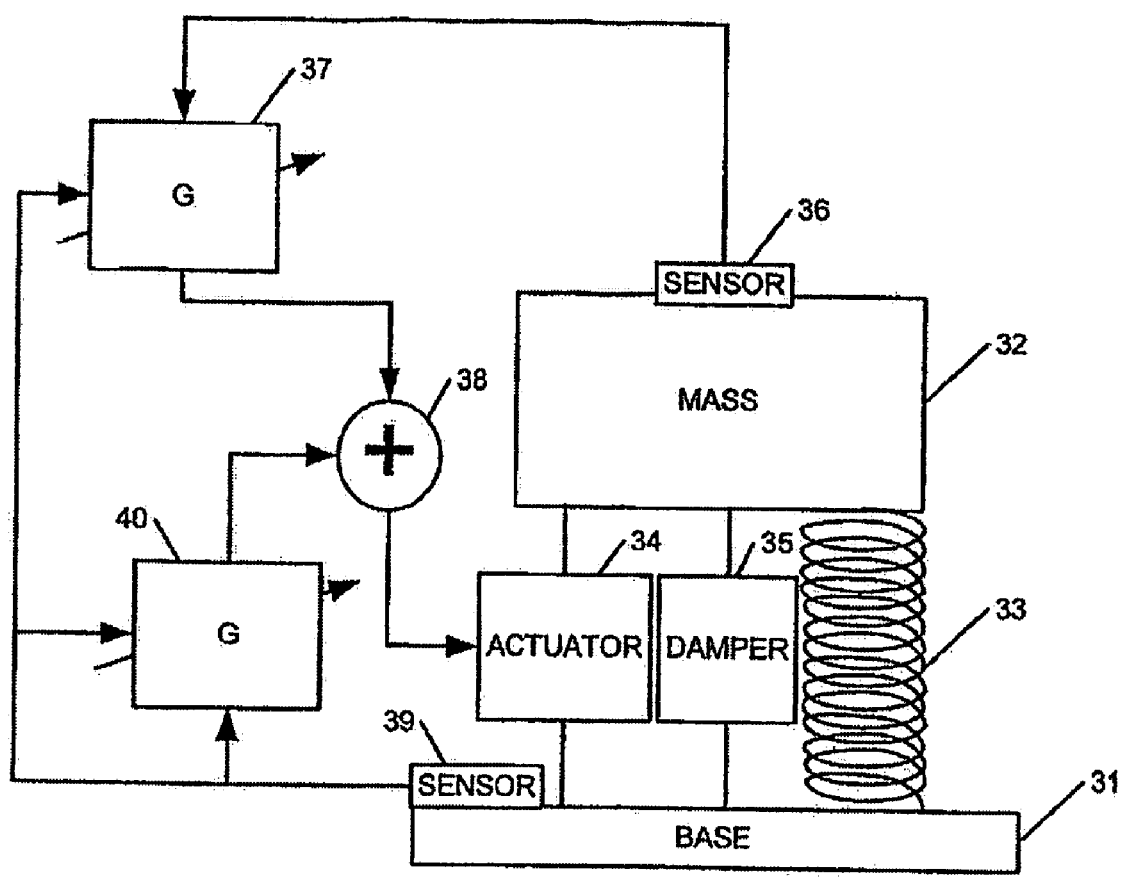
FIG. 5 is a schematic diagram of an active vibration absorber in accordance with a second embodiment of the present invention.

FIG. 5 illustrates a second embodiment of the present invention in which feedback control is provided together with a feedforward control of the application of a force between the mass and the base.

In this embodiment, a base 31 experiences vibrations which are to be absorbed. A mass 32 is provided stiffly mounted on the base 31 using a stiffness arrangement, which in this example comprises a spring arrangement 33.

A damper arrangement 35 is provided for damping oscillations between the mass 32 and the base 31. The damper 35 comprises a conventional passive damper arrangement such as a mechanical or fluid damping arrangement. Examples of such dampers are well known in the art and they can for example include eddy current damping, friction damping, viscous damping, or gas damping. Ideally, the damping arrangement 35 should provide relatively temperature independent damping to facilitate easy and accurate adaptive control.

Actuator arrangement 34 is provided between the mass 32 and the base 31 to provide for the application of a force between the mass 32 and the base 31. Feedback control of the actuator 34 is provided by the provision of a sensor 39 on the base 31. The sensor is provided for sensing vibration related parameters in the base 31 such as displacement, velocity, acceleration, strain, and bending. The output of the sensor 39 is input to the feedback controller 40. The feedback controller 40 is adaptive and generates an output control signal for the actuator 34 which is input into a summer 38 before being input to the actuator 34 to control the actuator 34.

A sensor 36 is provided on the mass 32 in order to provide a signal indicative of the reaction of the mass 32. The sensor can measure the displacement, velocity or acceleration of the mass 32. The sensor 36 could also be placed at either end of the spring arrangement 33 in order to sense the force. The sensor 36 could also be placed either side of the actuator 34 or damper 35 in order to detect the force. Thus the sensor 36 provides parameters related to the reaction of the mass. The output of the sensor 36 is input to a feedforward controller 37 which is adapted in dependence upon the feedback signal from the sensor 39. The feedforward controller 37 thus implements an adaptive feedforward control methodology as is well known in the prior art and examples of which are described in the book by B. Widrow and S. Stearns identified hereinabove. The output of the feedforward controller 37 is input to the summer 38 for summation with the feedback control signal from the feedback controller 40 and the combined feedforward and feedback control signals are applied to control the actuator 34.

Thus in accordance with this embodiment of the present invention, the problem of control of the actuator 34 when the output of the sensor 39 is small (or tends to zero) is overcome by the provision of the feedforward control arrangement.

The feedforward control arrangement can suffer from the disadvantage of the reference signal being corrupted by the controlling force from the actuator 34. The controller 37 can thus carry out a control algorithm such as that described in the commonly assigned and co-pending U.S. Patent Application filed Nov. 14, 2005, entitled "AN ADAPTIVE CONTROL UNIT WITH FEEDBACK COMPENSATION", having application Ser. No. 11/273 628, and UK Patent Application No. GB 0311085.5, both of which are herein incorporated by reference in their entirety.

Figure 6:
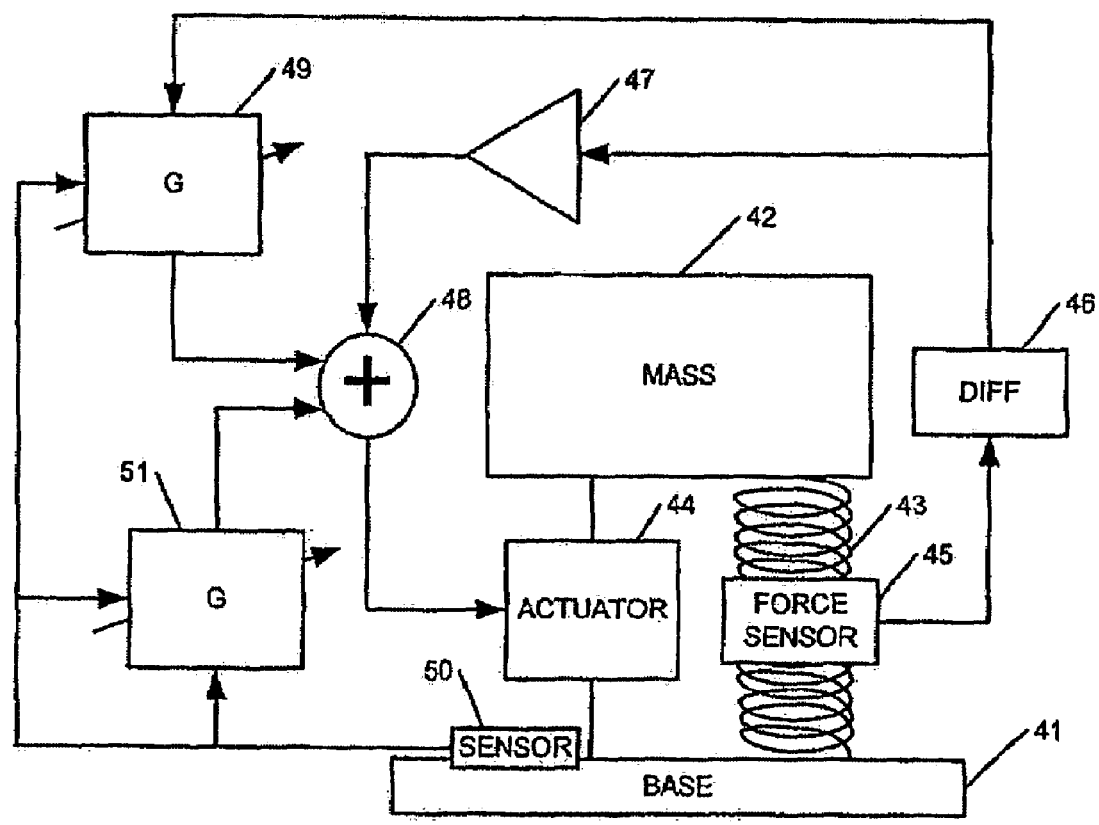
FIG. 6 is a schematic diagram of an active vibration absorber in accordance with a third embodiment of the present invention.

FIG. 6 illustrates a third embodiment of the present invention which is similar to the second embodiment of the present invention but also incorporates the principles of the first embodiment of the present invention. In this embodiment the actuator applies the force under the control of feedback and feedforward controllers and also performs active damping control.

A base 41 experiences vibrations which are to be absorbed. A mass 42 is provided stiffly mounted on the base 41 by a stiffness arrangement comprising a spring arrangement 43. A force actuator 44 is provided coupled between the mass 42 and the base 41 to provide for the application of a force between the mass 42 and the base 41. In order to provide for the active control of damping, a force sensor 45 is provided to generate a signal indicative of the force between the mass 42 and the base 41. A differentiator 46 is provided to differentiate the signal to provide a signal indicative of the relative velocity of the mass 42 and the base 41. For damping control, the signal is input to an amplifier 47 which performs amplification using a negative gain to generate a feedback control signal which is input to a summer 48. The output of the summer 48 is used to control the actuator 44. Thus in this way, in a similar manner to the first embodiment of the present invention, active damping is provided for.

The output of the differentiator 46 in this embodiment is also input to a feedforward controller 49. The feedforward controller generates a control signal which is input to the summer 48 and is summed with the damping control signal before being applied to the actuator 44. The feedforward controller 49 is fed with an error signal from an error sensor 50 mounted on the base 41 to provide for the adaptive feedforward control by the controller 49. Thus the feedforward controller 49 can provide for adaptive feedforward control either in an analogue or digital implementation. One such digital implementation is the filtered X least mean square algorithm as disclosed in the book by B. Widrow and S. Stearn acknowledged hereinabove.

The sensor 50 provided on the base 41 provides a measure of the vibrations in the base 41 by providing a signal indicative of displacement, velocity, acceleration, bending or stress in the base 41. The error signal is input to a feedback or virtual earth controller 51 which performs adaptive feedback control to generate an output control signal which is input to the summer 48. The summer 48 thus combines the adaptive damping control signal, the adaptive feedforward signal from the feedforward controller 49 and the adaptive feedback control signal from the adaptive feedback controller 51 to provide for the control of the force actuator 44.

This embodiment of the present invention is similar to the second embodiment of the present invention and also provides the advantage of avoiding the stability problems of providing for a high gain in the feedback controller 51 by provision of the feedforward controller 49. The provision of the active damping control arrangement provides for an improved active vibration absorber. Also in this embodiment, conveniently, the signal required for the adaptive damping is used for the adaptive feedforward controller input.

Figure 7:
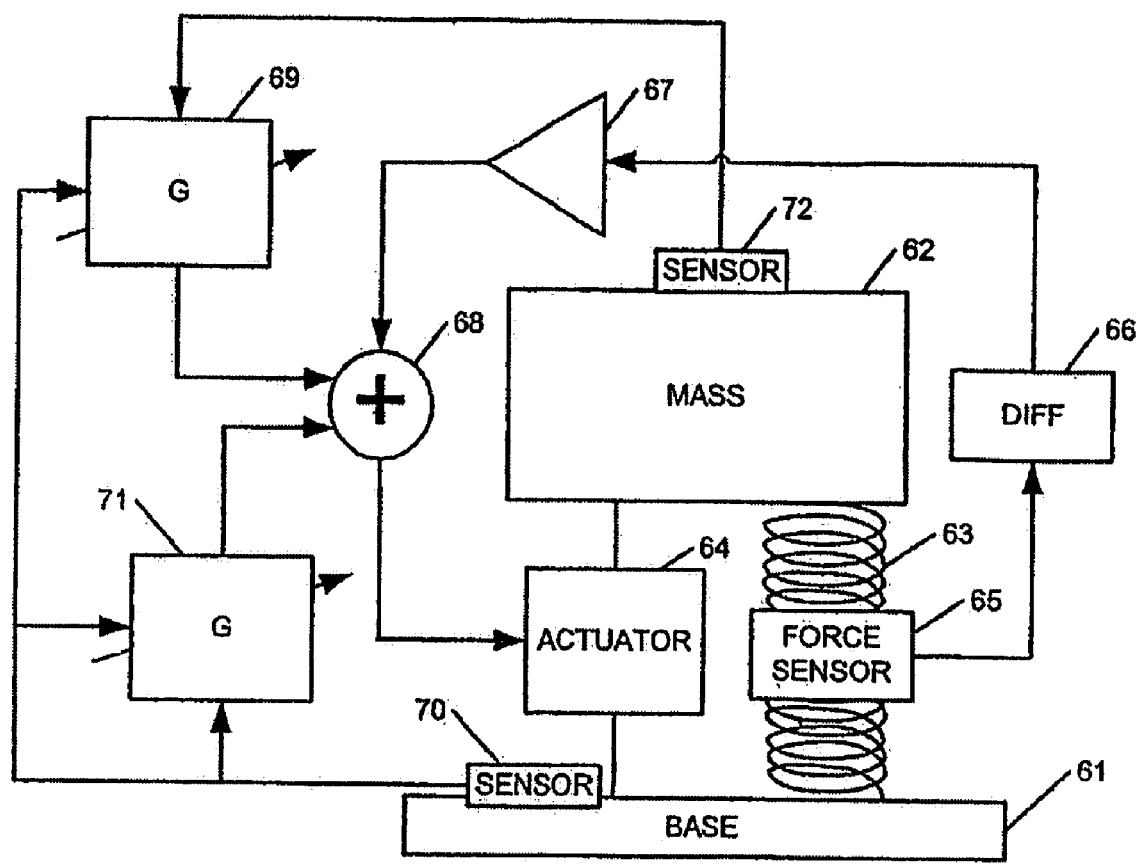
FIG. 7 is a schematic diagram of an active vibration absorber in accordance with a fourth embodiment of the present invention.

FIG. 7 illustrates a fourth embodiment of the present invention similar to the third embodiment of the present invention except that a separate reference sensor 72 is provided for the feedforward controller 69.

The base 61 experiences vibrations which are to be absorbed. A mass 62 is provided mounted to the base 61 by a stiffness arrangement comprising the spring arrangement 63. A force actuator 64 is provided mounted between the mass 62 and the base 61 to provide for the application of a force between the mass 62 and the base 61. A force sensor 65 is provided to measure the force experienced between the mass 62 and the base 61 and the spring arrangement 63. The output of the force sensor is input into a differentiator 66 to provide an output indicative of the relative velocity of the mass 62 and the base 61. The output of the differentiator 66 is input to an amplifier 67 which performs amplification on the signal using negative gain to generate a damping control signal which is input to the summer 68. The output of the summer 68 is input to the actuator 64 for control of the actuator 64. Thus in this embodiment of the present invention active damping is provided for.

The feedback control is provided by a sensor 70 mounted on the base 61 to provide a measure of the vibration in the base 61. The sensor 70 provides a measure of parameters related to displacement, velocity, acceleration, strain, or bending in the base 61. The output of the sensor 70 is input to the feedback controller 71 to perform adaptive feedback control. The output of the adaptive controller 71 is input to the summer 68.

The summer 68 sums the adaptive damping control signal and the adaptive feedback signal for control of the actuator 64.

The feedforward control is provided for by a sensor 72 mounted to measure the reaction of the mass 62. The sensor 72 can provide a measure of parameters indicative of the displacement, velocity or acceleration of the mass 62, or a force experienced between the mass 62 and the base 61, i.e. at any point in the spring arrangement 63, or either side of the actuator 64. The output of the sensor 72 is input to a feedforward controller 69 which performs adaptive feedforward control to generate a control signal which is input to the summer 68. The feedforward controller 69 receives an output of the sensor 70 for adaptive control of the parameters of the controller 69. Thus the actuator 64 is controlled by the output of the summer 68 to receive a damping control signal, a feedforward control signal and a feedback control signal.

In all of the embodiments described hereinabove with reference to FIGS. 4 to 7, an active vibration absorber is provided which is capable of broadband vibration absorption.

Although in the embodiments of the present invention the active damping is illustrated as being performed using an analogue amplifier, the generation of the active damping control signal can be carried out digitally, for example using a digital filter.

The adaptive feedforward controllers in the embodiments of the present invention can be implemented using analogue or digital technology or a combination of both. Digital algorithms for performing the adaptive feedback and feedforward controls are well known in the art.

Although in the embodiments illustrated in FIGS. 4 to 7 the mass 32 is illustrated as being stiffly mounted on the base 31 by a spring arrangement 33, the actuator 34 can provide for the stiff mounting of the mass 32 on the base 31, thus obviating the need for the spring arrangement 33. The actuator 34 can comprise any suitable force actuator such as an electromagnetic actuator, a piezoelectric actuator, a hydraulic actuator, a magnetostrictive actuator, a pneumatic actuator, an electrostatic actuator, or a thermal expansive actuator. Where an electromagnetic actuator is provided, usually a stiffness arrangement will be required to provide for the stiff mounting of the mass 32 on the base 31. Where for example the actuator 34 comprises a piezoelectric actuator, the piezoelectric actuator provides not only for the application of the force, but also for the stiff mounting of the mass 32 on the base 31.

Although in the embodiment of FIG. 5 a separate damper 35 is illustrated, the damper and stiffness arrangement 33 can be combined. The damper 35 can comprise any suitable well known passive damping arrangement such as an eddy current damper, a friction damper, a viscous damper or a gas damper.

In the embodiments of the present invention the sensor provided on the base can comprise any suitable sensor arrangement, i.e. a single sensor or a number of sensors, in order to provide one or more signals indicative of vibration in the base. The signal or signals can therefore comprise an indication of displacement, velocity, or acceleration in the base, or other physical parameters indicative of vibrations such as strain, or bending.

The reference sensor provided to output a signal indicative of the reaction of the inertial mass to the vibration in the base 31, can comprise not just a single sensor, but any suitable sensor arrangement comprising a single sensor or multiple sensors. The sensor can provide a measurement of movement of the mass, i.e. displacement, velocity or acceleration, or a measurement of the force between the mass and the base. The force can thus be measured within the spring arrangement, either in the middle or at either end, either side of a separate passive damper, or either side of the force actuator.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. An active vibration absorber for absorbing vibrations in a member, the active vibration absorber comprising:
    an inertial mass for mounting on said member with a stiffness therebetween;
    a force actuator arrangement for applying a force between said inertial mass and said member;
    a damping arrangement for providing damping of a resonance of said active vibration absorber;
    a first sensor arrangement for providing at least one first signal indicative of at least one movement and/or stress related parameter for said member;
    a second sensor arrangement for providing at least one second signal indicative of a reaction of said inertial mass; and
    a control arrangement for controlling said force actuator arrangement using said at least one first signal and said at least one second signal.

2. An active vibration absorber according to claim 1, including a stiffness arrangement for mounting said inertial mass to said member with stiffness therebetween.

3. An active vibration absorber according to claim 2, wherein said stiffness arrangement comprises a spring arrangement.

4. An active vibration absorber according to claim 1, wherein said force actuator arrangement is adapted to provide the stiff mounting of said inertial mass to said member.

5. An active vibration absorber according to claim 1, wherein said control arrangement comprises a first filter arrangement for filtering said at least one first signal, a second filter arrangement for filtering said at least one second signal, and a combining arrangement for combining outputs of said first and second filter arrangements for output to control said force actuator arrangement.

6. An active vibration absorber according to claim 5, wherein said second filter arrangement comprises an adaptive filter arrangement adaptive in response to said at least one first signal.

7. An active vibration absorber according to claim 5, wherein said first filter arrangement comprises an adaptive filter arrangement adaptive in response to said at least one first signal.

8. An active vibration absorber according to claim 1, wherein said damping arrangement comprises a third sensor arrangement for providing at least one third signal indicative of a velocity of said inertial mass, and a damping control arrangement adapted to use said third signal to control said force actuator arrangement to provide damping of a resonance of said active vibration absorber.

9. An active vibration absorber according to claim 1, wherein said second sensor arrangement is adapted to provide said at least one second signal to be indicative of a velocity of said inertial mass, and said damping arrangement comprises a damping control arrangement adapted to use said second signal to control said force actuator arrangement to provide damping of a resonance of said active vibration absorber.

10. An active vibration absorber according to claim 1, wherein said damping arrangement comprises a mechanical or fluid damping arrangement for connection between said inertial mass and said member.

11. An active vibration absorber for absorbing vibrations in a member, the active vibration absorber comprising:
    an inertial mass for mounting on said member with a stiffness therebetween;
    a force actuator arrangement for applying a force between said inertial mass and said member;
    a first sensor arrangement for providing at least one first signal indicative of a velocity of said inertial mass;
    a damping control arrangement for controlling a damping of a resonance of said active vibration absorber by controlling said force actuator arrangement using said at least one first signal;
    a second sensor arrangement for providing at least one second signal indicative of at least one of movement and/or stress related parameters for said member; and
    a feedback control arrangement for controlling said force actuator arrangement using said at least one second signal to reduce the movement and/or stress in said member.

12. An active vibration absorber according to claim 11, including a stiffness arrangement for mounting said inertial mass to said member with stiffness therebetween.

13. An active vibration absorber according to claim 12, wherein said stiffness arrangement comprises a spring arrangement.

14. An active vibration absorber according to claim 11, wherein said force actuator arrangement is adapted to provide the stiff mounting of said inertial mass to said member.

15. An active vibration absorber according to claim 11, wherein said feedback control arrangement comprises a filter arrangement for filtering said at least one second signal to generate a control signal for said force control arrangement.

16. An active vibration absorber according to claim 15, wherein said filter arrangement comprises an adaptive filter arrangement adaptive in response to said at least one second signal.

17. A method of absorbing vibrations in a member, the method comprising:
    mounting an inertial mass on said member with a stiffness therebetween;
    applying a force between said inertial mass and said member using a force actuator arrangement;
    damping a resonance of said inertial mass;
    providing at least one first signal indicative of at least one movement and/or stress related parameter for said member;
    providing at least one second signal indicative of a reaction of said inertial mass; and
    controlling the application of said force using said at least one first signal and said at least one second signal.

18. A method according to claim 17, wherein said inertial mass is mounted on said member using a spring arrangement to provide the stiffness.

19. A method according to claim 17, wherein said inertial mass is mounted on said force actuator arrangement to provide the stiff mounting of said inertial mass to said member.

20. A method according to claim 17, wherein said controlling takes place by filtering said at least one first signal using a first filter arrangement, filtering said at least one second signal using a second filter arrangement, and combining outputs of said first and second filter arrangements for output to control said force actuator arrangement.

21. A method according to claim 20, wherein said second filter arrangement is adapted in response to said at least one first signal.

22. A method according to claim 20 wherein said first filter arrangement is adapted in response to said at least one first signal.

23. A method according to claim 17, wherein said damping comprises providing at least one third signal indicative of a velocity of said inertial mass, and using said third signal to control said force actuator arrangement to provide damping of a resonance of said inertial mass.

24. A method according to claim 17, wherein said at least one second signal is indicative of a velocity of said inertial mass, and said damping comprises using said second signal to control said force actuator arrangement to provide damping of a resonance of said inertial mass.

25. A method according to claim 17, wherein said damping is carried out using a mechanical or fluid damping arrangement connected between said inertial mass and said member.

26. A method of absorbing vibrations in a member, the method comprising:
    mounting an inertial mass on said member with a stiffness therebetween;
    applying a force between said inertial mass and said member using a force actuator arrangement;
    providing at least one first signal indicative of a velocity of said inertial mass;
    controlling a damping of a resonance of said inertial mass by controlling said force actuator arrangement using said at least one first signal;
    providing at least one second signal indicative of at least one movement and/or stress related parameter for said member; and
    controlling said force actuator arrangement using said at least one second signal to reduce the movement and/or stress in said member.

27. A method according to claim 26, wherein said inertial mass is mounted on said member using a spring arrangement to provide the stiffness.

28. A method according to claim 26, wherein said inertial mass is mounted on said force actuator arrangement to provide the stiff mounting of said inertial mass to said member.

29. A method according to claim 26, wherein said controlling of said force actuator comprises filtering said at least one second signal using a filter arrangement to generate a control signal for said force control arrangement.

30. A method according to claim 29, wherein said filter arrangement is adapted in response to said at least one second signal.

* * * * *